Patented Nov. 14, 1950

2,530,080

UNITED STATES PATENT OFFICE 2,530,080

HALOGENATED AROMATIC COMPOUNDS

Preston Robinson, Williamstown, and Colin C. Reid, Boston, Mass., assignors to Sprague Electric Company, North Adams, Mass., a corporation of Massachusetts No Drawing. Application February 10, 1947, Serial No. 727,738

1 Claim. (Cl. 260—651)

This invention relates to new halogenated aromatic compounds and more particularly refers to completely substituted halogenated derivatives of benzene. The application is filed as a continuation-in-part of S. N. 607,500, filed on July 27, 1945, by Robinson and Reid, now abandoned.

An object of this invention is to produce new halogenated substituted derivatives of alkyl pentachlorobenzenes. A still further object is to produce new and useful derivatives of ethylpentachlorobenzene by relatively simple processes. Additional objects will become apparent from the following description and claims.

These objects are attained in accordance with our invention which is directed to a class of compounds conforming to the general formula:

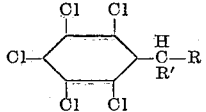

wherein R is a chloroalkyl group and R' is a substituent selected from the class containing hydrogen and hydrocarbon groups. In a more restricted sense, this invention is concerned with compounds conforming to the general formula:

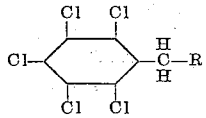

wherein R is a chloroalkyl group, preferably containing from one to three carbon atoms.

The parent case, upon which the present case is filed as a continuation-in-part, discloses chloroalkylpentachlorobenzenes and shows the chlorination of ethylpentachlorobenzene with sulfuryl chloride in the presence of benzoyl peroxide. The present invention is concerned with further methods of chlorination and the new products obtained by chlorination of fully substituted that is, perchlorinated, alkylchlorobenzenes.

The following tabulation includes representative compounds embraced within the scope of this invention. In the first general formula:

Where R is a chloromethyl radical and R' is a methyl radical, 1-chloro-2-pentachlorophenyl propane and where R is a chloroethyl radical and R' is a phenyl radical, 1-pentachlorophenyl-1-phenyl-3 chloropropane The second general formula embraces the preferred compounds of the invention, in which the total number of alkyl carbon atoms is from 2 to 4. Representative of these is betachloroethylpentachlorobenzene.

It is to be understood that the invention embraces related fully substituted benzene derivatives such as beta, beta' dichlorodiethyl tetrachlorobenzene

EXAMPLE 1

*Preparation of betachloroethylpentachlorobenzene*

1200 gms. carbontetrachloride
1253 gms. ethylpentachloro benzene (4.5 moles)
540 gms. sulfuryl chloride (4 moles)
4.84 gms. benzoyl peroxide (.02 mole)

The reactants were placed in a three liter, single-necked flask equipped with a bulb type reflux condenser to the top of which was attached a Friedrichs type reflux condenser and heated until reflux temperature was reached. A vigorous evolution of HCl and SO₂ began approximately 5 minutes after refluxing started. The mixture was heated thus for 17 hours at the end of which time evolution of gas was very slow. The condensers were removed and a Vigreux type heated fractionating column was attached. The carbontetrachloride and unreacted sulfuryl chloride were removed at 15 mm. pressure. More heat was applied and the residue was fractionated at 15 mm. to make the following fractions:

| Fraction No. | Boiling Point, °C. | Amount |
|---|---|---|
| | | Gms. |
| 1 | 177–182 | 464 |
| 2 | 182–185 | 99 |
| 3 | 190–201 | 542 |
| 4 | above 201 | 243 |

Fraction 3 was considered to be the betachloroethylpentachlorobenzene, and after recrystallization gave a melting point of 85° C. After repeated recrystallization, the M. P. reached 89.5–90.5 C.

The following table gives the calculated and experimental carbon and hydrogen percentage values for the betachloroethylpentachlorobenzene obtained above:

|  | Per Cent C | Per Cent H |
|---|---|---|
| Calculated | 30.7 | 1.27 |
| Observed: |  |  |
| #1 | 30.70 | 1.40 |
| #2 | 30.52 | 1.26 |

EXAMPLE 2

*Preparation of betachloroethylpentachlorobenzene*

68.3 gms. betachloro ethylbenzene
2.5 gms. aluminum chloride
4.1 gms. sulfur chloride ($S_2Cl_2$)
404 gms. sulfuryl chloride A three-necked flask equipped with a bulb and Friedrich's type reflux condenser in series, a thermometer and a dropping funnel was provided. The betachloroethylbenzene and aluminum chloride were introduced in the flask and the mixture of sulfur compounds added slowly through the dropping funnel over a period of two hours. The temperature was held between 70 and 85° C. for this time, as well as for an additional hour after which the evolution of hydrochloric acid became negligible. The reaction mixture was taken up in benzene and washed with dilute hydrochloric acid and water. The benzene extract was dried and distilled.

| Fraction | Pressure | Boiling Range | Weight |
|---|---|---|---|
|  | *Mm.* | *°C.* | *Gms.* |
| 1 | 12 | 176–185 | 5 |
| 2 | 11 | 185–190 | 24.4 |
| 3 | 11 | 189–197 | 58 |

Fraction number 3 was recrystallized from 95% ethyl alcohol to give a melting point of 85.5 to 88° C. The material gave no depression with a mixed melting point with the material described in Example 1 and is therefore the betachloroethylpentachlorobenzene.

The examples given above are merely representative of the methods of preparing the compounds of the invention and they, as well as others, are applicable to the synthesis of other compounds disclosed herein.

Diethyltetrachlorobenzene may be chlorinated as in Example 1, to produce a beta, beta' dichlorodiethyltetrachlorobenzene, plus some beta chloro ethyl, ethyl tetrachlorobenzene. This reaction proceeds well and the yield of dichloro product is dependent upon the time and temperature of reaction, to a large extent.

Because of the reactive aliphatic chlorine, the compounds of the invention are particularly useful in the Friedel-Crafts coupling reaction with numerous aryl compounds, as disclosed in the parent application. Such coupled products, which range from crystalline solids to liquids, all possess high boiling points and are useful in many fields.

While the example disclosed herein have been concerned particularly with ethylbenzene derivatives, propyl, butyl, amyl, hexyl, heptyl, octyl and other aliphatic pentachlorobenzenes may likewise be treated to produce chloroalkylpentachlorobenzenes which are useful as such or as intermediates for further reactions. When the total number of carbon atoms in the alkyl side chain is greater than two, it is desirable to chlorinate with liquid or gaseous chlorine, in the presence of light.

The compounds produced herein form an extremely useful class for use as such or as intermediates for further syntheses. These compounds are useful for a variety of purposes, including heat transfer application, dielectric applications, flame-proofing compositions, degreasing and cleaning agents and the like. They may be employed for the production of polymerizable vinyl compounds and the like. Conversion of the compounds of this invention to high molecular weight carboxylic acids and esters by standard reactions are also possible. Their use as intermediates in the synthesis of dye-stuffs and pigments is also of interest.

As many apparently widely different embodiments of this invention may be made without departing from the spirit and scope hereof, it is to be understood that the invention is not limited to the specific embodiments hereof except as defined in the appended claim.

What is claimed is:

A process for producing predominantly betachloroethylpentachlorobenzene which comprises refluxing a mixture of ethylpentachlorobenzene, sulfuryl chloride and carbon tetrachloride in the presence of benzoyl peroxide.

PRESTON ROBINSON.
COLIN C. REID.

REFERENCES CITED

The following references are of record in the file of this patent:

UNITED STATES PATENTS

| Number | Name | Date |
|---|---|---|
| 2,193,823 | Levine et al. | Mar. 19, 1940 |
| 2,302,228 | Kharasch et al. | Nov. 17, 1942 |

OTHER REFERENCES

Ross et al.: "Jour. Am. Chem. Soc.," vol. 69, pages 1914–17 (1947).

Marvel et al.: "Ind. and Eng. Chem.," vol. 39, pages 1486–90 (1947).